US010397846B2

(12) United States Patent
Dang et al.

(10) Patent No.: US 10,397,846 B2
(45) Date of Patent: Aug. 27, 2019

(54) METHOD AND APPARATUS FOR DETERMINING TARGET CELL

(71) Applicant: Huawei Technologies Co., Ltd., Shenzhen (CN)

(72) Inventors: Shujun Dang, Beijing (CN); Xiaoyan Duan, Beijing (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/570,633

(22) PCT Filed: Apr. 29, 2015

(86) PCT No.: PCT/CN2015/077790
§ 371 (c)(1),
(2) Date: Oct. 30, 2017

(87) PCT Pub. No.: WO2016/172873
PCT Pub. Date: Nov. 3, 2016

(65) Prior Publication Data
US 2019/0007883 A1 Jan. 3, 2019

(51) Int. Cl.
*H04W 24/02* (2009.01)
*H04W 36/24* (2009.01)
(Continued)

(52) U.S. Cl.
CPC ........... *H04W 36/30* (2013.01); *H04W 24/02* (2013.01); *H04W 36/245* (2013.01); *H04W 36/36* (2013.01); *H04W 88/02* (2013.01)

(58) Field of Classification Search
CPC ........... H04W 24/02–10; H04W 36/0005–385; H04W 40/24–38; H04W 48/02–20
See application file for complete search history.

(56) References Cited

U.S. PATENT DOCUMENTS

2008/0014944 A1 1/2008 Choi
2008/0108353 A1* 5/2008 Lee ..................... H04J 11/0093 455/437
(Continued)

FOREIGN PATENT DOCUMENTS

CN 1469680 A 1/2004
CN 1832622 A 9/2006
(Continued)

OTHER PUBLICATIONS

Machine Translation and Abstract of Chinese Publication No. CN101325757, Dec. 17, 2008, 23 pages.
Machine Translation and Abstract of Chinese Publication No. CN101600242, Dec. 9, 2009, 13 pages.
Machine Translation and Abstract of Chinese Publication No. CN102088718, Jun. 8, 2011, 14 pages.
(Continued)

*Primary Examiner* — Timothy J Weidner
(74) *Attorney, Agent, or Firm* — Conley Rose, P.C.

(57) ABSTRACT

A method and an apparatus relate to the communications field, used for determining a target cell, where the method includes obtaining, by a terminal, a historical camped-on cell list of the terminal and a neighboring cell list of a serving cell of the terminal, determining, by the terminal, that a first cell list is the neighboring cell list of the serving cell and the historical camped-on cell list when a signal strength of the serving cell of the terminal is less than or equal to a first preset value, performing, by the terminal, measurement for a cell in the first cell list to obtain a measurement result, and determining, by the terminal, a target cell from the first cell list according to the measurement result.

18 Claims, 2 Drawing Sheets

(51) Int. Cl.

| | |
|---|---|
| ***H04W 36/30*** | (2009.01) |
| ***H04W 36/36*** | (2009.01) |
| ***H04W 88/02*** | (2009.01) |

(56) References Cited

U.S. PATENT DOCUMENTS

| | | | | |
|---|---|---|---|---|
| 2015/0004970 | A1 | 1/2015 | Venkatachari et al. | |
| 2015/0036663 | A1 | 2/2015 | Kilpatrick, II et al. | |
| 2015/0312813 | A1* | 10/2015 | Xu .................... | H04W 36/0055 455/438 |
| 2016/0112826 | A1* | 4/2016 | Brisebois .............. | H04W 8/005 455/41.1 |

FOREIGN PATENT DOCUMENTS

| | | | |
|---|---|---|---|
| CN | 101325757 | A | 12/2008 |
| CN | 101600242 | A | 12/2009 |
| CN | 101646197 | A | 2/2010 |
| CN | 101827407 | A | 9/2010 |
| CN | 102088718 | A | 6/2011 |
| CN | 102395165 | A | 3/2012 |
| EP | 1594327 | A1 | 11/2005 |
| EP | 2355582 | A1 | 8/2011 |

OTHER PUBLICATIONS

Machine Translation and Abstract of Chinese Publication No. CN102395165, Mar. 28, 2012, 20 pages.

Foreign Communication From a Counterpart Application, PCT Application No. PCT/CN2015/077790, English Translation of International Search Report dated Feb. 2, 2016, 2 pages.

Foreign Communication From a Counterpart Application, PCT Application No. PCT/CN2015/077790, English Translation of Written Opinion dated Feb. 2, 2016, 5 pages.

Mitsubishi Electric, "Collecting mobility statistics in support of configuration and optimisation of LTE/SAE networks," R3-070660, Mar. 27-30, 2007, 3 pages.

Foreign Communication From a Counterpart Application, European Application No. 15890253.6, Extended European Search Report dated Feb. 28, 2018, 13 pages.

Machine Translation and Abstract of Chinese Publication No. CN1832622, Sep. 13, 2006, 11 pages.

Machine Translation and Abstract of Chinese Publication No. CN101646197, Feb. 10, 2010, 17 pages.

Machine Translation and Abstract of Chinese Publication No. CN101827407, Sep. 8, 2010, 19 pages.

Foreign Communication From A Counterpart Application, Chinese Application No. 201580030689.5, Chinese Office Action dated Mar. 14, 2019, 7 pages.

* cited by examiner

METHOD AND APPARATUS FOR DETERMINING TARGET CELL

CROSS-REFERENCE TO RELATED APPLICATION

This application is a U.S. National Stage of International Patent Application No. PCT/CN2015/077790 filed on Apr. 29, 2015, which is hereby incorporated by reference in its entirety.

TECHNICAL FIELD

The present disclosure relates to the communications field, and in particular, to a method and an apparatus for determining a target cell.

BACKGROUND

Cell reselection and cell handover are basic operations of a terminal in a mobile communications network, and are foundations on which the terminal ensures a network connection and service continuity in a movement process.

In an existing cell reselection process, the terminal performs measurement for only a neighboring cell broadcast by a serving cell. Only the neighboring cell of the serving cell can be used as a target cell for the cell reselection when a signal of the serving cell becomes weak. The terminal is dropped from a network when a signal of the neighboring cell of the serving cell is weaker or the neighboring cell of the serving cell has no signal. In a cell handover process, the terminal performs measurement for only a neighboring cell indicated by the serving cell. Only the neighboring cell indicated by the serving cell can be used as a target cell for the cell handover when the signal of the serving cell becomes weak. A service of the terminal is interrupted when a signal of the neighboring cell indicated by the serving cell is weaker or the neighboring cell indicated by the serving cell has no signal. In an actual scenario, a case in which there is an isolated cell is encountered. For example, besides a French window of a high-rise building, there is usually signal coverage of another cell far from the isolated cell, and the signal coverage is relatively strong, but signal coverage of the isolated cell is relatively weak. Because the other cell is relatively far from the isolated cell, and the isolated cell and the other cell are not mutually configured as neighboring cells, a terminal is dropped from a network or a service of the terminal is interrupted according to the cell reselection and handover processes in other approaches.

Therefore, when a serving cell has no neighboring cell or a neighboring cell cannot satisfy a condition of cell reselection or cell handover, a solution in the other approaches causes a terminal to be dropped from a network or a service of the terminal to be interrupted.

SUMMARY

Embodiments of the present disclosure provide a method and an apparatus for determining a target cell in order to use a historical camped-on cell of a terminal as a target cell for cell reselection or cell handover, thereby reducing a probability that the terminal is dropped from a network or a service of the terminal is interrupted.

To achieve the foregoing objective, the following technical solutions are used in the embodiments of the present disclosure.

According to a first aspect, an embodiment of the present disclosure provides a method for determining a target cell, including obtaining, by a terminal, a historical camped-on cell list of the terminal and a neighboring cell list of a serving cell of the terminal, determining, by the terminal, that a first cell list is the neighboring cell list of the serving cell and the historical camped-on cell list if a signal strength of the serving cell of the terminal is less than or equal to a first preset value, performing, by the terminal, measurement for a cell in the first cell list to obtain a measurement result, and determining, by the terminal, a target cell from the first cell list according to the measurement result.

With reference to the first aspect, in a first possible implementation manner of the first aspect, performing, by the terminal, measurement for a cell in the first cell list to obtain a measurement result includes performing, by the terminal, measurement for a cell in the neighboring cell list of the serving cell to obtain a measurement result of a neighboring cell of the serving cell, and performing measurement for a cell in the historical camped-on cell list to obtain a measurement result of a historical camped-on cell, or performing, by the terminal, measurement for a cell in the neighboring cell list of the serving cell, and performing measurement for a cell in the historical camped-on cell list to obtain a measurement result of a historical camped-on cell if a signal strength of the cell in the neighboring cell list of the serving cell is less than a second preset value or a measurement result does not satisfy a preset condition.

With reference to the first aspect or the first possible implementation manner of the first aspect, in a second possible implementation manner of the first aspect, the historical camped-on cell list includes a preset quantity of cells, where a cell in the historical camped-on cell list is a cell on which the terminal last camps before the terminal is dropped from a network or is dropped from a call.

With reference to the first aspect, the first possible implementation manner of the first aspect, or the second possible implementation manner of the first aspect, in a third possible implementation manner of the first aspect, the method further includes recording, by the terminal, historical camped-on cells in the historical camped-on cell list according to an order of time when the terminal camps on the historical camped-on cells.

With reference to any one of the first aspect or the first possible implementation manner of the first aspect to the third possible implementation manner of the first aspect, in a fourth possible implementation manner of the first aspect, the method further includes setting, by the terminal, an index for each historical camped-on cell in the historical camped-on cell list, where the index is used to indicate a cell on which the terminal first camps after the terminal leaves the historical camped-on cell.

With reference to any one of the first aspect or the first possible implementation manner of the first aspect to the fourth possible implementation manner of the first aspect, in a fifth possible implementation manner of the first aspect, the method further includes deleting information about the historical camped-on cell from the historical camped-on cell list when duration in which the terminal is away from a historical camped-on cell is longer than preset duration.

According to a second aspect, an embodiment of the present disclosure provides an apparatus for determining a target cell, including an obtaining module configured to obtain a historical camped-on cell list of a terminal and a neighboring cell list of a serving cell of the terminal, a determining module configured to determine that a first cell list is the neighboring cell list of the serving cell and the historical camped-on cell list if a signal strength of the serving cell of the terminal is less than or equal to a first preset value, and a measurement module configured to perform measurement for a cell in the first cell list to obtain a measurement result, where the determining module is configured to determine a target cell from the first cell list according to the measurement result.

With reference to the second aspect, in a first possible implementation manner of the second aspect, the measurement module is further configured to perform measurement for a cell in the neighboring cell list of the serving cell to obtain a measurement result of a neighboring cell of the serving cell, and perform measurement for a cell in the historical camped-on cell list to obtain a measurement result of a historical camped-on cell, or perform measurement for a cell in the neighboring cell list of the serving cell, and perform measurement for a cell in the historical camped-on cell list to obtain a measurement result of a historical camped-on cell if a signal strength of the cell in the neighboring cell list of the serving cell is less than a second preset value or a measurement result does not satisfy a preset condition.

With reference to the second aspect or the first possible implementation manner of the second aspect, in a second possible implementation manner of the second aspect, the historical camped-on cell list includes a preset quantity of cells, where a cell in the historical camped-on cell list is a cell on which the terminal last camps before the terminal is dropped from a network or is dropped from a call.

With reference to any one of the second aspect or the first possible implementation manner of the second aspect to the second possible implementation manner of the second aspect, in a third possible implementation manner of the second aspect, the apparatus further includes a recording module configured to record historical camped-on cells in the historical camped-on cell list according to an order of time when the terminal camps on the historical camped-on cells.

With reference to any one of the second aspect or the first possible implementation manner of the second aspect to the third possible implementation manner of the second aspect, in a fourth possible implementation manner of the second aspect, the apparatus further includes a setting module configured to set an index for each historical camped-on cell in the historical camped-on cell list, where the index is used to indicate a cell on which the terminal first camps after the terminal leaves the historical camped-on cell.

With reference to any one of the second aspect or the first possible implementation manner of the second aspect to the fourth possible implementation manner of the second aspect, in a fifth possible implementation manner of the second aspect, the apparatus further includes an update module configured to delete information about the historical camped-on cell from the historical camped-on cell list when duration in which the terminal is away from a historical camped-on cell is longer than preset duration.

According to a third aspect, an embodiment of the present disclosure provides an apparatus for determining a target cell, including a processor configured to obtain a historical camped-on cell list of a terminal and a neighboring cell list of a serving cell of the terminal, determine that a first cell list is the neighboring cell list of the serving cell and the historical camped-on cell list if a signal strength of the serving cell of the terminal is less than or equal to a first preset value, perform measurement for a cell in the first cell list to obtain a measurement result, and determine a target cell from the first cell list according to the measurement result.

With reference to the third aspect, in a first possible implementation manner of the third aspect, the processor is further configured to perform measurement for a cell in the neighboring cell list of the serving cell to obtain a measurement result of a neighboring cell of the serving cell, and perform measurement for a cell in the historical camped-on cell list to obtain a measurement result of a historical camped-on cell, or perform measurement for a cell in the neighboring cell list of the serving cell, and perform measurement for a cell in the historical camped-on cell list to obtain a measurement result of a historical camped-on cell if a signal strength of the cell in the neighboring cell list of the serving cell is less than a second preset value or a measurement result does not satisfy a preset condition.

With reference to the third aspect or the first possible implementation manner of the third aspect, in a second possible implementation manner of the third aspect, the historical camped-on cell list includes a preset quantity of cells, where a cell in the historical camped-on cell list is a cell on which the terminal last camps before the terminal is dropped from a network or is dropped from a call.

With reference to the third aspect, the first possible implementation manner of the third aspect, or the second possible implementation manner of the third aspect, in a third possible implementation manner of the third aspect, the apparatus further includes a memory configured to record historical camped-on cells in the historical camped-on cell list according to an order of time when the terminal camps on the historical camped-on cells.

With reference to any one of the third aspect or the first possible implementation manner of the third aspect to the third possible implementation manner of the third aspect, in a fourth possible implementation manner of the third aspect, the processor is further configured to set an index for each historical camped-on cell in the historical camped-on cell list, where the index is used to indicate a cell on which the terminal first camps after the terminal leaves the historical camped-on cell.

With reference to any one of the third aspect or the first possible implementation manner of the third aspect to the fourth possible implementation manner of the third aspect, in a fifth possible implementation manner of the third aspect, the processor is further configured to delete information about the historical camped-on cell from the historical camped-on cell list when duration in which the terminal is away from a historical camped-on cell is longer than preset duration.

The embodiments of the present disclosure provide a method and an apparatus for determining a target cell. The method includes obtaining, by a terminal, a historical camped-on cell list of the terminal and a neighboring cell list of a serving cell of the terminal, determining, by the terminal, that a first cell list is the neighboring cell list of the serving cell and the historical camped-on cell list if a signal strength of the serving cell of the terminal is less than or equal to a first preset value, performing, by the terminal, measurement for a cell in the first cell list to obtain a measurement result, and determining, by the terminal, a target cell from the first cell list according to the measurement result.

Based on the descriptions of the foregoing embodiments, by means of the method and the apparatus for determining a target cell that are provided in the embodiments of the present disclosure, when a neighboring cell of a serving cell of a terminal cannot satisfy a condition for the terminal to perform reselection or handover, a historical camped-on cell of the terminal may be used as a target cell for the terminal to perform the reselection or the handover, thereby reducing a probability that the terminal is dropped from a network or a service of the terminal is interrupted.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
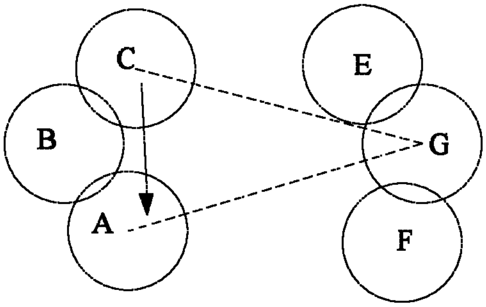
FIG. 1 is a schematic diagram of a scenario in which a terminal is located.

After a terminal is dropped from a network at a place, the terminal camps on a new cell after a period of time, and the new cell and an original cell may not be mutually configured as neighboring cells. As shown in FIG. 1, for example, besides a French window of a high-rise building, there is usually signal coverage of a cell (a cell G in FIG. 1) far from the building, and signal coverage of a local cell (a cell C in FIG. 1) is relatively weak. Because the cell G is relatively far from the cell C, they are not mutually configured as neighboring cells. In a process in which a terminal moves from the cell C to a cell A along a direction indicated by an arrow in FIG. 1, by means of solutions of cell reselection and cell handover in the other approaches, because there is no appropriate target cell of neighboring cells of the cell C to serve the terminal, a service of the terminal is interrupted or the terminal is dropped from a network. A method for determining a target cell that is provided in the following embodiments of the present disclosure can resolve the foregoing problem. In the process in which the terminal moves from the cell C to the cell A, the terminal may access the cell G, thereby avoiding service interruption of the terminal.

Embodiment 1

Figure 2:
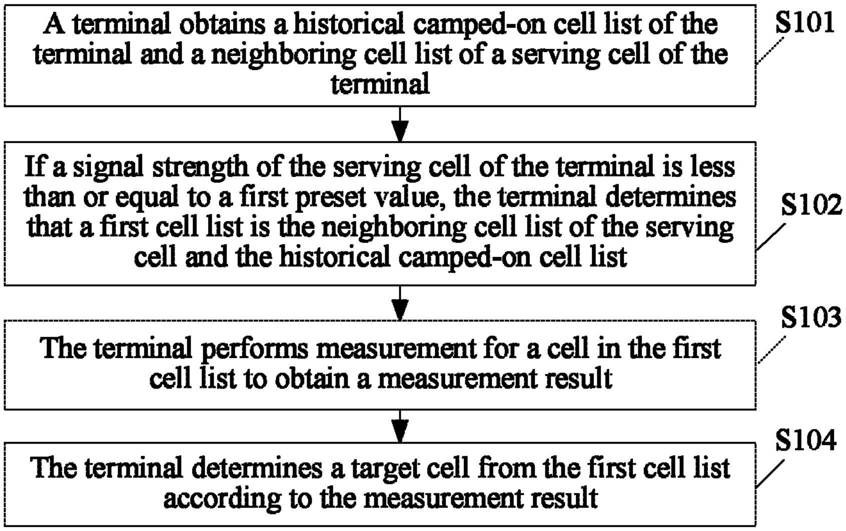
FIG. 2 is a schematic flowchart 1 of a method for determining a target cell according to an embodiment of the present disclosure.

This embodiment of the present disclosure provides a method for determining a target cell. FIG. 2 is a schematic flowchart of the method for determining a target cell, and the method includes the following steps.

Step S101: A terminal obtains a historical camped-on cell list of the terminal and a neighboring cell list of a serving cell of the terminal.

A historical camped-on cell in the historical camped-on cell list refers to a cell that is camped on by or accessed by the terminal before the terminal camps on or accesses the serving cell. The serving cell refers to a cell that currently serves the terminal. A neighboring cell of the serving cell in the neighboring cell list of the serving cell refers to a cell neighboring to the serving cell. Generally, the neighboring cell of the serving cell is preconfigured in the neighboring cell list of the serving cell.

It may be understood that a cell in the neighboring cell list of the serving cell may be the same as a cell in the historical camped-on cell list.

The terminal records information about the historical camped-on cell in the historical camped-on cell list. Therefore, the information about the historical camped-on cell is obtained from the terminal. Information about the neighboring cell of the serving cell is provided by the serving cell. Further, in a cell reselection process, the terminal receives system information broadcast by a base station to which the serving cell belongs, and obtains the information about the neighboring cell of the serving cell from the system information. In a cell handover process, the terminal receives a measurement configuration delivered by the base station to which the serving cell belongs, and obtains the information about the neighboring cell of the serving cell from the measurement configuration.

Step S102: If a signal strength of the serving cell of the terminal is less than or equal to a first preset value, the terminal determines that a first cell list is the neighboring cell list of the serving cell and the historical camped-on cell list.

It may be understood that if the signal strength of the serving cell is greater than the preset value, the terminal determines that the first cell list is the neighboring cell list of the serving cell, or if the signal strength of the serving cell is less than or equal to the preset value, the terminal determines that the first cell list is the neighboring cell list of the serving cell and the historical camped-on cell list. A probability that reselection/handover occurs is relatively small when the signal strength of the serving cell is relatively high. Therefore, measurement may be performed for only the neighboring cell of the serving cell, thereby achieving an objective of saving power of the terminal. When the signal strength of the serving cell is relatively high, the first cell list is the neighboring cell list of the serving cell, a process performed by the terminal subsequently is the same as that in the other approaches.

Step S103: The terminal performs measurement for a cell in the first cell list to obtain a measurement result.

After determining the first cell list, the terminal starts to perform measurement for the cell in the first cell list. Further, a measurement counter includes at least one of a signal power, signal quality, a working frequency of the cell in the first cell list, or a network standard supported by the cell in the first cell list. The measurement result is used to indicate whether the cell in the first cell list may be used as a target cell for cell reselection or cell handover performed by the terminal.

Step S104: The terminal determines a target cell from the first cell list according to the measurement result.

During cell reselection, if multiple cells in the first cell list satisfy a condition of being a target cell for the cell reselection, the terminal selects a cell, whose signal power or signal quality is the highest, of the multiple cells to perform the cell reselection.

During cell handover, the terminal reports measurement results of cells in the first cell list to a base station to which the serving cell belongs. The base station selects an appropriate cell as a target cell for the handover of the terminal according to the measurement results of the cells. The terminal is handed over to the target cell according to a handover command delivered by the base station to which the serving cell belongs. Further, the other approaches may be used in a process in which the base station determines the target cell for the cell handover according to the measurement result reported by the terminal. This is not limited in the present disclosure.

This embodiment of the present disclosure provides a method for determining a target cell, including obtaining, by a terminal, a historical camped-on cell list of the terminal and a neighboring cell list of a serving cell of the terminal, determining, by the terminal, that a first cell list is the neighboring cell list of the serving cell and the historical camped-on cell list if a signal strength of the serving cell of the terminal is less than or equal to a first preset value, performing, by the terminal, measurement for a cell in the first cell list to obtain a measurement result, and determining, by the terminal, a target cell from the first cell list according to the measurement result.

Based on the descriptions of the foregoing embodiment, by means of the method and the apparatus for determining a target cell provided in this embodiment of the present disclosure, when a neighboring cell of a serving cell of a terminal cannot satisfy a condition for the terminal to perform reselection or handover, a historical camped-on cell of the terminal may be used as a target cell for the terminal to perform the reselection or the handover, thereby reducing a probability that the terminal is dropped from a network or a service of the terminal is interrupted.

Embodiment 2

This embodiment of the present disclosure provides a method for determining a target cell, and the method for determining a target cell may be applied to a process including, but not limited to, a process of cell reselection or cell handover.

Figure 3:
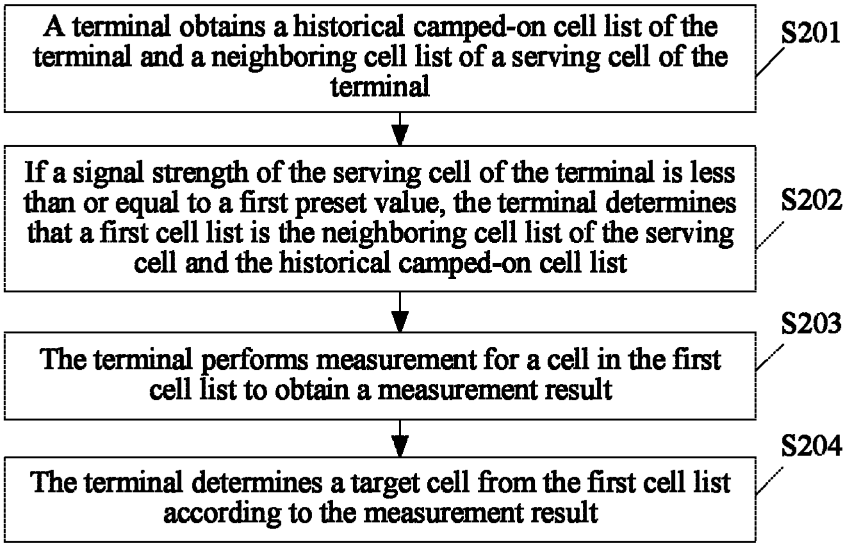
FIG. 3 is a schematic flowchart 2 of a method for determining a target cell according to an embodiment of the present disclosure.

For example, as shown in FIG. 3, the method for determining a target cell provided in this embodiment of the present disclosure is applied to a cell reselection process.

Step S201: A terminal obtains a historical camped-on cell list of the terminal and a neighboring cell list of a serving cell of the terminal.

In this embodiment of the present disclosure, after the terminal accesses the serving cell, if cell reselection needs to be performed, a neighboring cell of the serving cell and a historical camped-on cell may be comprehensively considered such that a cell whose signal strength is the best is selected as a target cell for the cell reselection. Further, the signal strength includes a signal power or signal quality, or the signal strength includes a signal power and signal quality.

The terminal directly reads, from the historical camped-on cell list of the terminal, information about the historical camped-on cell. Information about the neighboring cell of the serving cell is carried by system information broadcast by a base station to which the serving cell belongs. The terminal camps on the serving cell, receives the system information broadcast by the base station to which the serving cell belongs, and obtains information about the neighboring cell of the serving cell from the system information.

Step S202: If a signal strength of the serving cell of the terminal is less than or equal to a first preset value, the terminal determines that a first cell list is the neighboring cell list of the serving cell and the historical camped-on cell list.

The terminal determines the first cell list according to the signal strength of the serving cell.

The first cell list is the neighboring cell list of the serving cell, or the first cell list is the neighboring cell list of the serving cell and the historical camped-on cell list.

Further, if the signal strength of the serving cell is greater than the preset value, a cell in the first cell list is only a neighboring cell of the serving cell, or if the signal strength of the serving cell is less than or equal to the preset value, cells in the first cell list include a neighboring cell of the serving cell and a historical camped-on cell. When the first cell list includes only the neighboring cell in the neighboring cell list of the serving cell, the terminal performs measurement for only the neighboring cell of the serving cell, or if the first cell list includes a sum of the neighboring cell of the serving cell and the historical camped-on cell, the terminal combines the neighboring cell list of the serving cell and the historical camped-on cell list, and performs measurement for all cells after the combination. Further, that the terminal combines the neighboring cells of the serving cell and the historical camped-on cells includes that the first cell list does not include repeated cell information if a cell in the neighboring cell list of the serving cell of terminal is the same as a cell in the historical camped-on cell list of terminal. For example, if the neighboring cell list of the serving cell and the historical camped-on cell list of the terminal both include information about a cell A, a combined list (that is, the first cell list) includes only one piece of information about the cell A.

Step S203: The terminal performs measurement for a cell in the first cell list to obtain a measurement result.

It may be known from step S202 that the first cell list includes two cases. A first case is that the first cell list includes only the neighboring cell of the serving cell. A second case is that the first cell list includes the neighboring cell of the serving cell and the historical camped-on cell of the terminal.

In the first case, the terminal performs measurement for all cells in the first cell list. Further, the terminal may measure a signal power or signal quality of each cell in the first cell list, or measure both a signal power and signal quality of each cell in the first cell list, and select an appropriate cell as the target cell for the cell reselection according to a measurement result. Further, a method in the other approaches may be used to select the appropriate cell as the target cell for the cell selection. In the second case, the terminal performs measurement for all cells in the first cell list. That the terminal may perform measurement for all cells (including the neighboring cell of the serving cell and the historical camped-on cell) in the first cell list may include that the terminal measures a signal power or signal quality of each cell in the first cell list, or measures both a signal power and signal quality of each cell in the first cell list, and selects an appropriate cell as the target cell for the cell reselection according to a measurement result. Alternatively, the terminal first performs measurement for the neighboring cell of the serving cell in the first cell list. When a signal strength of the neighboring cell of the serving cell is less than a second preset value or a measurement result of a neighboring cell of the serving cell does not satisfy a condition of the cell reselection, the terminal then performs measurement for the historical camped-on cell in the first cell list in order to select an appropriate cell as the target cell for the cell reselection. That the signal strength of the neighboring cell of the serving cell is less than the second preset value indicates that a signal of the neighboring cell of the serving cell is relatively weak, and the terminal cannot perform measurement for the neighboring cell of the serving cell.

Step S204: The terminal determines a target cell from the first cell list according to the measurement result.

The terminal selects an appropriate cell as the target cell for the cell reselection according to a cell reselection decision criterion to perform the cell reselection process.

Further, when the first cell list includes the neighboring cell list of the serving cell and the historical camped-on cell list, and when the measurement result satisfies the following conditions, the terminal selects the historical camped-on cell as the target cell for the cell reselection. The conditions are as follows.

(1) A signal power of the historical camped-on cell is greater than a threshold a1 or signal quality of the historical camped-on cell is greater than a threshold a2, or a signal power of the historical camped-on cell is greater than the threshold a1 and signal quality of the historical camped-on cell is greater than the threshold a2. In addition, a signal power of the serving cell is less than a threshold b1 or signal quality of the serving cell is less than a threshold b2, or a signal power of the serving cell is less than the threshold b1 and signal quality of the serving cell is less than the threshold b2; or (2) A signal power of the historical camped-on cell is greater than a threshold c1 or signal quality of the historical camped-on cell is greater than a threshold c2, or a signal power of the historical camped-on cell is greater than the threshold c1 and signal quality of the historical camped-on cell is greater than the threshold c2.

Values of a1, a2, b1, b2, c1, and c2 herein may be preconfigured according to actual experience, or may be configured according to a parameter in the system information sent by the serving cell. Further, priorities of the historical camped-on cell and the serving cell may be configured. If the priority of the historical camped-on cell is relatively high, the foregoing condition (2) is used, or if the priority of the historical camped-on cell is relatively low, the foregoing condition (1) is used.

The terminal may select a historical camped-on cell whose signal power or signal quality is the highest as the target cell for the cell reselection when multiple historical camped-on cells satisfy the foregoing conditions.

It should be noted that a cell in the historical camped-on cell list is a cell on which the terminal last camps before the terminal is dropped from a network or is dropped from a call.

For example, when a change of "camping-network dropping" (that is, normal camping is changed to network dropping) or a change of "normal call-dropped call" (that is, a normal call is changed to a dropped call) occurs in a movement process of the terminal, an identifier (ID) of a cell on which the terminal last camps before the terminal is dropped from the network or is dropped from the call is added to the historical camped-on cell list.

It should be noted that the historical camped-on cell list includes a preset quantity of cells, and the historical camped-on cell list is stored in a memory. Optionally, cells in the historical camped-on cell list may be stored according to an order of time when the terminal camps on the cells. In addition, the terminal may set an index for each historical camped-on cell in the historical camped-on cell list, where the index is used to indicate a cell on which the terminal first camps after the terminal leaves the historical camped-on cell.

The terminal sets an index for each historical camped-on cell in the historical camped-on cell list. For example, if the terminal camps on a cell A, is dropped from a network in a movement process, and then camps on or accesses a cell G, an index that is set by the terminal for the cell A (a historical camped-on cell) is an ID of the cell G. If the terminal camps on a cell B, moves to a cell D during a call, and is dropped from the call, that is, the call is disconnected, an index that is set by the terminal for the cell B (another historical camped-on cell) is an ID of the cell D.

Because the historical camped-on cell has time validity, the stored historical camped-on cells need to be updated. Further, when duration in which the terminal is away from a historical camped-on cell is longer than preset duration, information about the historical camped-on cell is deleted from the historical camped-on cell list.

For example, if the historical camped-on cell list is set in a manner of including information about a preset quantity (for example, five) of historical camped-on cells, when the memory has stored the information about the five historical camped-on cells, if information about a new historical camped-on cell needs to be written to the memory, the information about the new historical camped-on cell is used to cover the information about the historical camped-on cells that are first stored such that the information about the historical camped-on cell is updated.

Alternatively, when the information about the historical camped-on cells is stored, duration in which the terminal is away from a historical camped-on cell is also recorded, and when the duration in which the terminal is away from the historical camped-on cell is longer than the preset duration, information about the historical camped-on cell is deleted such that the information about the historical camped-on cell is updated.

For example, the following process occurs on the terminal in a period of time. The terminal camps on a cell A—is dropped from a network—camps on a cell B—is dropped from a network—camps on a cell C—is dropped from a network—camps on a cell D—is dropped from a network—camps on a cell E. If the memory used by the terminal to store the information about the historical camped-on cell may store information about a maximum of three historical camped-on cells, in the foregoing process, after the historical camped-on cell list stores information about the cell A, the cell B, and the cell C, no storage space remains. When information about the newest historical camped-on cell D needs to be written, the information about the cell D is used to cover the information about the cell A such that the historical camped-on cell list stores the information about the cell D, the information about the cell B, and the information about the cell C.

For another example, the method for determining a target cell provided in this embodiment of the present disclosure may also be applied to a cell handover process, and details are not described herein again.

This embodiment of the present disclosure provides a method for determining a target cell, including obtaining, by a terminal, a historical camped-on cell list of the terminal and a neighboring cell list of a serving cell of the terminal, determining, by the terminal, that a first cell list is the neighboring cell list of the serving cell and the historical camped-on cell list if a signal strength of the serving cell of the terminal is less than or equal to a first preset value, performing, by the terminal, measurement for a cell in the first cell list to obtain a measurement result, and determining, by the terminal, a target cell from the first cell list according to the measurement result.

Based on the descriptions of the foregoing embodiment, by means of the method and the apparatus for determining a target cell provided in this embodiment of the present disclosure, when a neighboring cell of a serving cell of a terminal cannot satisfy a condition for the terminal to perform reselection or handover, a historical camped-on cell of the terminal may be used as a target cell for the terminal to perform the reselection or the handover, thereby reducing a probability that the terminal is dropped from a network or a service of the terminal is interrupted.

Embodiment 3

Figure 4:
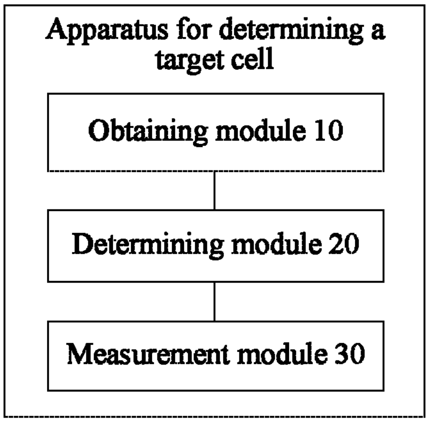
FIG. 4 is a schematic structural diagram 1 of an apparatus for determining a target cell according to an embodiment of the present disclosure.

This embodiment of the present disclosure provides an apparatus for determining a target cell. FIG. 4 is a schematic structural diagram of the apparatus, and the apparatus includes an obtaining module 10 configured to obtain a historical camped-on cell list of a terminal and a neighboring cell list of a serving cell of the terminal, a determining module 20 configured to determine that a first cell list is the neighboring cell list of the serving cell and the historical camped-on cell list if a signal strength of the serving cell of the terminal is less than or equal to a first preset value, and a measurement module 30 configured to perform measurement for a cell in the first cell list to obtain a measurement result, where the determining module 20 is configured to determine a target cell from the first cell list according to the measurement result.

The measurement module 30 is further configured to perform measurement for a cell in the neighboring cell list of the serving cell to obtain a measurement result of a neighboring cell of the serving cell, and perform measurement for a cell in the historical camped-on cell list to obtain a measurement result of a historical camped-on cell, or perform measurement for a cell in the neighboring cell list of the serving cell, and perform measurement for a cell in the historical camped-on cell list to obtain a measurement result of a historical camped-on cell if a signal strength of the cell in the neighboring cell list of the serving cell is less than a second preset value or a measurement result does not satisfy a preset condition.

The historical camped-on cell list includes a preset quantity of cells, and a cell in the historical camped-on cell list is a cell on which the terminal last camps before the terminal is dropped from a network or is dropped from a call.

Figure 5:
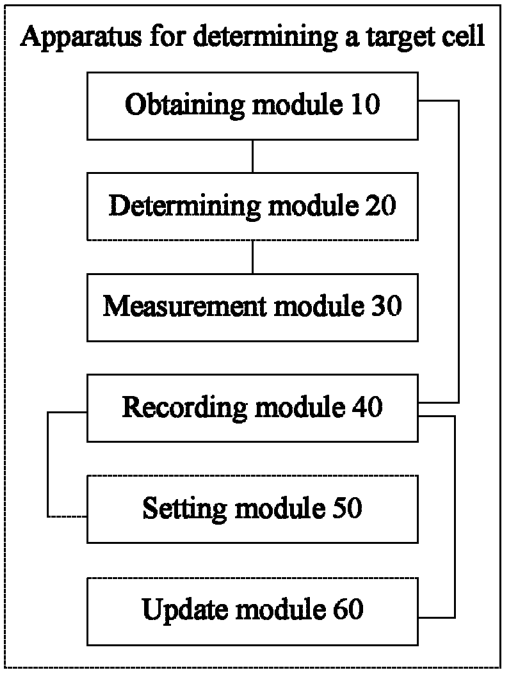
FIG. 5 is a schematic structural diagram 2 of an apparatus for determining a target cell according to an embodiment of the present disclosure.

As shown in FIG. 5, the apparatus for determining a target cell further includes a recording module 40 configured to record historical camped-on cells in the historical camped-on cell list according to an order of time when the terminal camps on the historical camped-on cells, a setting module 50 configured to set an index for each historical camped-on cell in the historical camped-on cell list, where the index is used to indicate a cell on which the terminal first camps after the terminal leaves the historical camped-on cell, and an update module 60 configured to delete information about the historical camped-on cell from the historical camped-on cell list when duration in which the terminal is away from a historical camped-on cell is longer than preset duration.

This embodiment of the present disclosure provides the apparatus for determining a target cell, including the obtaining module 10 configured to obtain a historical camped-on cell list of a terminal and a neighboring cell list of a serving cell of the terminal, the determining module 20 configured to determine that a first cell list is the neighboring cell list of the serving cell and the historical camped-on cell list if a signal strength of the serving cell of the terminal is less than or equal to a first preset value, and the measurement module 30 configured to perform measurement for a cell in the first cell list to obtain a measurement result, where the determining module 20 is further configured to determine a target cell from the first cell list according to the measurement result.

Based on the descriptions of the foregoing embodiment, by means of the method and the apparatus for determining a target cell provided in this embodiment of the present disclosure, when a neighboring cell of a serving cell of a terminal cannot satisfy a condition for the terminal to perform reselection or handover, a historical camped-on cell of the terminal may be used as a target cell for the terminal to perform the reselection or the handover, thereby reducing a probability that the terminal is dropped from a network or a service of the terminal is interrupted.

Embodiment 4

Figure 6:
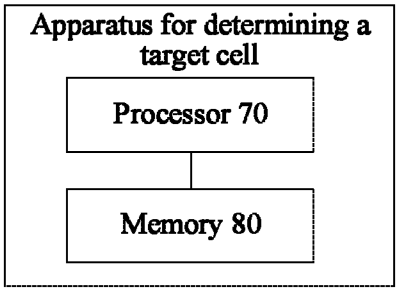
FIG. 6 is a schematic structural diagram 3 of an apparatus for determining a target cell according to an embodiment of the present disclosure.

This embodiment of the present disclosure provides an apparatus for determining a target cell. As shown in FIG. 6, the apparatus includes a processor 70 configured to obtain a historical camped-on cell list of a terminal and a neighboring cell list of a serving cell of the terminal, determine that a first cell list is the neighboring cell list of the serving cell and the historical camped-on cell list if a signal strength of the serving cell of the terminal is less than or equal to a first preset value, perform measurement for a cell in the first cell list to obtain a measurement result, and determine a target cell from the first cell list according to the measurement result.

The processor 70 is further configured to perform measurement for a cell in the neighboring cell list of the serving cell to obtain a measurement result of a neighboring cell of the serving cell, and perform measurement for a cell in the historical camped-on cell list to obtain a measurement result of a historical camped-on cell, or perform measurement for a cell in the neighboring cell list of the serving cell, and perform measurement for a cell in the historical camped-on cell list to obtain a measurement result of a historical camped-on cell if a signal strength of the cell in the neighboring cell list of the serving cell is less than a second preset value or a measurement result does not satisfy a preset condition.

The historical camped-on cell list includes a preset quantity of cells, and a cell in the historical camped-on cell list is a cell on which the terminal last camps before the terminal is dropped from a network or is dropped from a call.

The apparatus further includes a memory 80 configured to record historical camped-on cells in the historical camped-on cell list according to an order of time when the terminal camps on the historical camped-on cells.

The processor 70 is further configured to set an index for each historical camped-on cell in the historical camped-on cell list, where the index is used to indicate a cell on which the terminal first camps after the terminal leaves the historical camped-on cell.

The processor 70 is further configured to delete information about the historical camped-on cell from the historical camped-on cell list when duration in which the terminal is away from a historical camped-on cell is longer than preset duration.

This embodiment of the present disclosure provides the apparatus for determining a target cell, including the processor 70 configured to obtain a historical camped-on cell list of a terminal and a neighboring cell list of a serving cell of the terminal, determine that a first cell list is the neighboring cell list of the serving cell and the historical camped-on cell list if a signal strength of the serving cell of the terminal is less than or equal to a first preset value, perform measurement for a cell in the first cell list to obtain a measurement result, and determine a target cell from the first cell list according to the measurement result.

Based on the descriptions of the foregoing embodiment, by means of the method and the apparatus for determining a target cell provided in this embodiment of the present disclosure, when a neighboring cell of a serving cell of a terminal cannot satisfy a condition for the terminal to perform reselection or handover, a historical camped-on cell of the terminal may be used as a target cell for the terminal to perform the reselection or the handover, thereby reducing a probability that the terminal is dropped from a network or a service of the terminal is interrupted.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a target cell, the method comprising:

obtaining, by a terminal, a historical camped-on cell list of the terminal and a neighboring cell list of a serving cell of the terminal;

determining, by the terminal, a first cell list comprising the neighboring cell list of the serving cell when the signal strength of the serving cell is greater than a first preset value, the first cell list further comprising the historical camped-on cell list when the signal strength is less than or equal to the first preset value;

performing, by the terminal, measurement for one or more cells in the first cell list to obtain a measurement result, wherein performing the measurement for the one or more cells comprises performing, by the terminal, measurement of each historical camped-on cell in the historical camped-on cell list to obtain a measurement result of the historical camped-on cell based on a signal strength of each cell in the neighboring cell list being less than a second preset value; and determining, by the terminal, a target cell from the first cell list according to the measurement result.

2. The method of claim 1, wherein performing the measurement for the one or more cells in the first cell list to obtain the measurement result comprises:

performing, by the terminal, measurement for a cell in the neighboring cell list of the serving cell to obtain a measurement result of a neighboring cell of the serving cell; and performing, by the terminal, measurement for a cell in the historical camped-on cell list to obtain a measurement result of a historical camped-on cell.

3. The method of claim 1, wherein the first cell list includes the neighboring cell list and the historical camped-on cell list, and performing the measurement for the one or more cells in the first cell list to obtain the measurement result comprises:

performing, by the terminal, measurement for a cell in the neighboring cell list of the serving cell; and determining that the signal strength of each cell in the neighboring cell list is less than the second preset value, wherein the second preset value is different than the first preset value.

4. The method of claim 1, wherein the first cell list includes the neighboring cell list and the historical camped-on cell list, and performing the measurement for the one or more cells in the first cell list to obtain the measurement result comprises performing, by the terminal, measurement for a cell in the neighboring cell list of the serving cell.

5. The method of claim 1, wherein the historical camped-on cell list comprises a preset quantity of cells, and a cell in the historical camped-on cell list is a cell on which the terminal last camps before the terminal is dropped from a network.

6. The method of claim 1, wherein the historical camped-on cell list comprises a preset quantity of cells, and a cell in the historical camped-on cell list is a cell on which the terminal last camps before the terminal is dropped from a call.

7. The method of claim 1, further comprising recording, by the terminal, historical camped-on cells in the historical camped-on cell list according to an order of time when the terminal camps on the historical camped-on cells.

8. The method of claim 1, further comprising setting, by the terminal, an index for each historical camped-on cell in the historical camped-on cell list, and wherein an index indicates a cell on which the terminal first camps after the terminal leaves a historical camped-on cell.

9. The method of claim 1, further comprising deleting, by the terminal, information about a historical camped-on cell from the historical camped-on cell list when a duration in which the terminal is away from the historical camped-on cell is longer than a preset duration.

10. An apparatus for determining a target cell, the apparatus comprising:

a memory storing instructions; and one or more processors coupled to the memory, the instructions causing the one or more processors to be configured to:

obtain a historical camped-on cell list of a terminal and a neighboring cell list of a serving cell of the terminal;

determine a first cell list comprising the neighboring cell list of the serving cell when the signal strength of the serving cell is greater than a first preset value, the first cell list further comprising the historical camped-on cell list when the signal strength is less than or equal to the first preset value;

perform measurement for one or more cells in the first cell list to obtain a measurement result, wherein performing the measurement for the one or more cells comprises performing, by the terminal, measurement of each historical camped-on cell in the historical camped-on cell list to obtain a measurement result of the historical camped-on cell based on a signal strength of each cell in the neighboring cell list being less than a second preset value; and determine a target cell from the first cell list according to the measurement result.

11. The apparatus of claim 10, wherein the instructions further cause the one or more processors to be configured to:

perform measurement for a cell in the neighboring cell list of the serving cell to obtain a measurement result of a neighboring cell of the serving cell; and perform measurement for a cell in the historical camped-on cell list to obtain a measurement result of a historical camped-on cell.

12. The apparatus of claim 10, wherein the instructions further cause the one or more processors to be configured to:

perform measurement for a cell in the neighboring cell list of the serving cell; and determine that the signal strength of each cell in the neighboring cell list is less than the second preset value, wherein the second preset value is different than the first preset value.

13. The apparatus of claim 10, wherein the instructions further cause the one or more processors to be configured to perform measurement for a cell in the neighboring cell list of the serving cell.

14. The apparatus of claim 10, wherein the historical camped-on cell list comprises a preset quantity of cells, and a cell in the historical camped-on cell list is a cell on which the terminal last camps before the terminal is dropped from a network.

15. The apparatus of claim 10, wherein the historical camped-on cell list comprises a preset quantity of cells, and a cell in the historical camped-on cell list is a cell on which the terminal last camps before the terminal is dropped from a call.

16. The apparatus of claim 10, wherein the instructions further cause the one or more processors to be configured to record historical camped-on cells in the historical camped-on cell list according to an order of time when the terminal camps on the historical camped-on cells.

17. The apparatus of claim 10, wherein the instructions further cause the one or more processors to be configured to set an index for each historical camped-on cell in the historical camped-on cell list, and an index indicates a cell on which the terminal first camps after the terminal leaves a historical camped-on cell.

18. The apparatus of claim 10, wherein the instructions further cause the one or more processors to be configured to delete information about a historical camped-on cell from the historical camped-on cell list when a duration in which the terminal is away from the historical camped-on cell is longer than a preset duration.

* * * * *